June 14, 1938.  H. G. BEAUCHAMP  2,120,457
MEANS FOR PROTECTING ELECTRICAL DEVICES
Filed Oct. 21, 1935
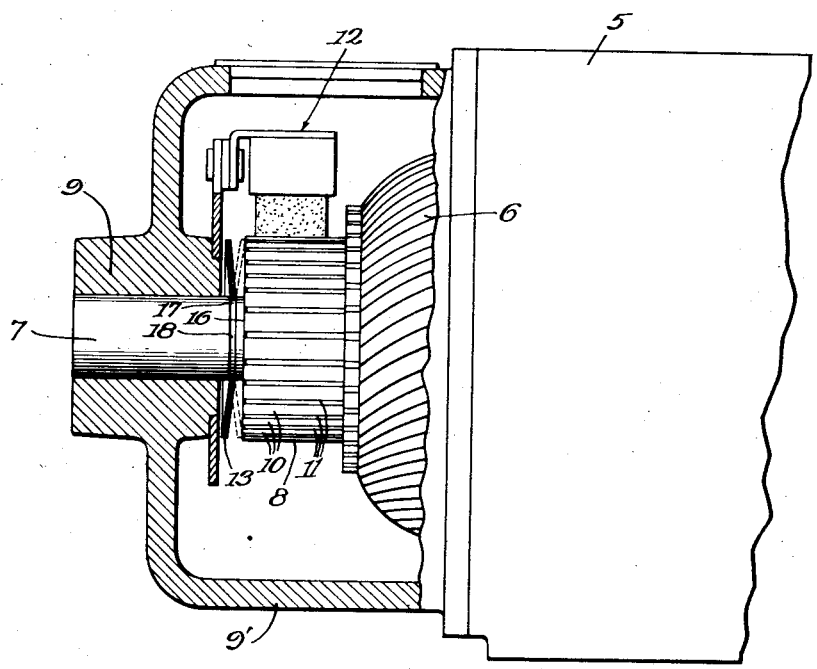
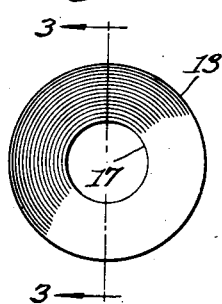
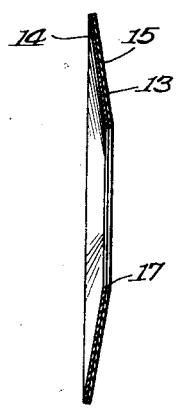
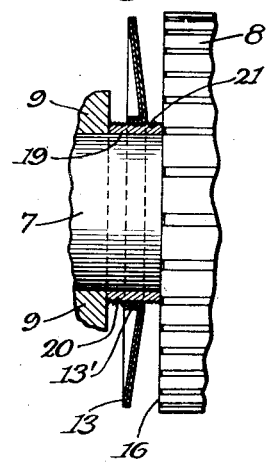
Inventor:
Harold G. Beauchamp
By Fisher, Clapp, Soans & Pond Attys.

Patented June 14, 1938

2,120,457

UNITED STATES PATENT OFFICE 2,120,457

MEANS FOR PROTECTING ELECTRICAL DEVICES

Harold G. Beauchamp, Chicago, Ill., assignor to Edward Babel, Chicago, Ill.

Application October 21, 1935, Serial No. 45,843

8 Claims. (Cl. 171—320)

This invention relates to improvements in means for protecting electrical devices and more particularly to an improvement for preventing generators and like electrical devices from burning out.

Electrical generators, especially those used on automobiles, frequently become damaged as an incident to the high degree of heat generated in connection with the generating of relatively high amperage currents.

High temperatures incident to high charging rates in automobile generators tend to and frequently do melt soldered connections between the wires of the rotor and the various segments of the commutator, and in some instances the damage caused by excessive heat is in the nature of burned out or impaired insulation between wires both on the rotor or armature and on the field.

High charging rates which cause excessive temperatures are more or less necessary in automobile generators at the present time because of the wide-spread use of radio receiving apparatus in automobiles with corresponding high demands on the usual electric storage battery, which must therefore be subjected to considerably more charging than was necessary prior to the advent of automobile radio receiving sets.

The main objects of the invention are to provide a device which will be automatically controlled by the heat of the generator or other electrical device and which, under predetermined thermal conditions, will prevent electrical operation of the device so as to prevent the generation of more heat and so as to permit the device to cool; to provide an efficient device of the character mentioned which may be incorporated in the generator or the like as a factory built-in element or as an accessory; to provide such a device which will be simple in construction and inexpensive to produce, but which will be durable and free from difficult adjustment requirements; and in general, it is the object of the invention to provide an improved means for protecting electrical equipment of the character mentioned.

Other objects and advantages of the invention will be understood by reference to the following specification and accompanying drawing, wherein a selected embodiment of the invention is illustrated in its association with an automobile generator.

In the drawing:

Fig. 1 is a fragmentary view, partly in elevation and partly in section, of an automobile generator.

Fig. 2 is a plan of the main element of the protective means herein referred to.

Fig. 3 is a section on the line 3—3 of Fig. 2; and

Fig. 4 is a section corresponding to a portion of Fig. 1, but showing a modified arrangement.

Referring now to the drawing, the generator shown in part in Fig. 1, is of the type more or less conventionally used in automobiles, and comprises a casing 5 which encloses the usual field and armature. A portion of the armature winding is indicated at 6 and the armature shaft and commutator are indicated respectively at 7 and 8. The end portion of the shaft 7 at the commutator end of the armature is represented as being journaled in a boss or hub 9 formed as an integral part of an end cap 9' which is suitably secured to the main generator casing 5.

The commutator 8 comprises a plurality of relatively independent and relatively insulated segments which are severally designated 10, the same being electrically insulated from each other by layers of insulation material designated 11. Current collecting brushes cooperate with the commutator in accordance with conventional practice, one of such brushes and a holder therefor being more or less schematically represented at 12.

The winding 6 of the armature comprises a plurality of wire coils which have ends respectively electrically connected to the segments 10 of the commutator. Such connections (not shown in the drawing because they are normally located at the inside end of the commutator and concealed by the winding) are usually formed by soldering to insure good electrical contact.

Excessive heat developed in the device incident to a high charging rate results in softening of the solder in the connections between the armature windings and the segments of the commutator. Centrifugal force incident to the normal high-speed rotation of the armature tends to throw out softened solder and the loosened wire ends with resultant impairment of said electrical connections. Even in the absence of centrifugal force, the normal tension on the end portions of the wires may cause the same, when the solder is softened, to pull away from the commutator segments. Also, burning of insulation may render the generator completely inoperative.

To prevent the development of excessive heat, I provide a thermostatic element or member 13 which is in the form of a slightly cupped washer and made of bi-metallic sheet material. The bi-metallic washer-like member may be made of any suitable materials, for example, a suitable brass composition, indicated at 14, and a suitable steel or alloy indicated at 15, which has a much lower co-efficient of expansion under heat than the brass part 14. As indicated most clearly in Fig. 3, the device is initially formed so that when cooled, the brass side is concave or dished.

The thermostatic element 13 is mounted on the shaft 7 of the generator in spaced relation to the end face 16 of the commutator. The member 13 may be anchored in position by having its inner edge 17 seated in a shallow groove 18 formed in the shaft. The depth of the groove 18 need not be great and the washer being inherently somewhat resilient may be forced over the shaft until the inner periphery 17 of the washer snaps into the groove provided therefor.

Other suitable means may be provided for holding the member 13 in predetermined spaced relation to the end face of the commutator. For example, spacing sleeves could be provided on opposite sides of the thermostatic element between the latter and the adjacent faces of the commutator and boss 9 respectively. The shaft might also be provided with suitable holes for receiving transversely disposed pins, the ends of which would project sufficiently to position the thermostatic element.

If desired, the thermostatic element 13 may be mounted so as to be adjustable toward and from the adjacent end face of the commutator. One means for so mounting the thermostatic element is illustrated in Fig. 4 and consists in the provision of an externally threaded sleeve 19 which may be either loose or fast on the shaft 7 between the end of the commutator 8 and the inside face of the boss 9. The inner periphery of the thermostatic element 13 is provided with screw-threading to fit the threads on the sleeve 19 and, if desired, the inner periphery of said thermostatic element may be flanged as indicated at 13' to increase the width of bearing of the thermostatic element on the sleeve. The inter-engaging threads of the thermostatic element and sleeve may be made of such a tight fit that once the thermostatic element is properly adjusted on the sleeve relative to the end face of the commutator, it will remain in such adjustment or the parts may be more freely adjustable and locked in adjusted position by pin or other means within the skill of an ordinary mechanic. A very practical means for locking the thermostatic element 13 in adjusted position would be to upset or otherwise deform portions of the threads of the sleeve 19 on opposite sides of the member 13, as indicated at 20 and 21. Such upsetting or deformation may readily be accomplished with the aid of a prick-punch or the like and a hammer.

When employing a thermostatic element 13 such as herein disclosed, it is preferable that the end faces of the commutator segments which form the end 16 of the commutator be finished smooth and disposed in substantially co-planar relation. It is also desirable, although perhaps not necessary, that the insulation elements 11 be slightly undercut with reference to the commutator end 16 substantially in the same manner as is commonly practiced with reference to the cylindrical surface of the commutator.

When a generator equipped with a thermostatic member such as 13 becomes heated to a predetermined temperature, the thermostatic element 13 will reverse its position with a quick snap action so as to cause its steel side 15 to be dished or concave, with the result that the peripheral edge of the member 13 resiliently engages the end faces of some or all of the commutator segments 10. Obviously, the temperature at which the thermostatic ring 13 will reverse its concavity is dependent upon the relative expansion or contraction of the metals forming the opposite faces of the member. Hence, by proper selection of materials and by proper proportions in respect of thickness of the metals used, the reversing action may be caused to take place at any predetermined temperature. When the thermostatic element is heated and thereby caused to reverse its position to contact the segments 10, the generator will thereupon be inoperative, since the windings 6 are directly interconnected so as to become, in effect, a solid mass of copper on the shaft 7. Under such conditions, electric current will not be generated and the generator will be permitted to cool, even though the armature continues to rotate incident to the operation of the automobile or other device with which the generator is associated. When the temperature in the generator is reduced sufficiently, the thermostatic element will automatically reverse or restore itself to its initial position, whereupon the generator will at once begin to deliver a generated electric current.

It will be apparent that the thermostatic element described will not have a rapid vibrating or wavering action, but will act with a quick and pronounced snap action, the movement when heated taking place at any predetermined temperature and the return, when cool, taking place at a temperature which is materially reduced from the high temperature causing the first action. Hence a continuous period of time elapses between movements of the thermostatic element during which time periods cooling of the generator takes place. Also, it will be noted that because of the periodic action of the thermostatic element, as distinguished from a rapid wavering or vibrating action, the generator is operative to deliver electric current for extended periods.

The described improvement is obviously very easy to manufacture and involves no expensive parts so that its cost is sufficiently low to be a very minor factor in the cost of producing generators equipped with the device. Also, the device involves no extremely sensitive parts or fine adjustments, but is rugged and durable so as to be well adapted for the purpose indicated.

Changes in the above described structure may be made without departing from the spirit of the invention, the scope of which should be determined by reference to the following claims, the same being construed as broadly as possible consistent with the state of the art.

I claim:

1. In combination with an electrical device including a rotor comprising a commutator having a plurality of relatively insulated segments, said segments being arranged to form a substantially cylindrical commutator surface for cooperation with contact brushes and having substantially co-planar end surfaces, and thermally actuated means associated with said commutator but normally electrically disconnected therefrom and adapted under predetermined thermal conditions to engage the end surfaces of some of said relatively insulated segments to electrically connect the same.

2. In combination with an electrical device having a rotor including a shaft and a commutator on said shaft, said commutator comprising a plurality of relatively insulated segments having substantially co-planar end surfaces, and a thermally actuated element mounted on said shaft and normally disposed in electrically insulated, relatively spaced relation to the end surfaces of said commutator segments, said member being adapted under predetermined thermal conditions to automatically move into contact with the end surfaces of some of said segments to thereby electrically connect the same.

3. In an electrical device including a rotor having a shaft and a commutator on said shaft, the commutator comprising a plurality of relatively insulated segments having substantially co-planar end surfaces, a thermally actuated member mounted on said shaft in normally spaced relation to said commutator, said member having a substantially circular periphery and being adapted under predetermined thermal conditions to move its peripheral portion into engagement with the end surfaces of some of said segments to thereby electrically connect the same.

4. In combination with an electrical generator comprising a housing and an armature having a shaft rotatably mounted in said housing and provided with a commutator, said commutator comprising a plurality of segments insulated from each other and from said shaft and provided with substantially co-planar end faces disposed in spaced relation to the adjacent end of said housing, and a thermally responsive member comprising a bi-metallic cupped annulus mounted on said shaft, the outer periphery of the cupped annulus being normally spaced farther from the end surfaces of said commutator segments than the inner periphery of said annulus, said member being adapted under predetermined thermal conditions to reverse its position with a snap action to thereby cause its outer periphery to engage said co-planar end surfaces of said segments, substantially as described.

5. In rotating electrical machinery, a stator which includes a set of windings for cooperating therewith, a bi-metallic, thermally responsive element entirely supported upon said rotor and movable in a direction generally parallel to the axis of rotation of said rotor between two extreme positions with a snap action, and means whereby said thermally responsive element when in one of said two positions serves to short circuit at least a portion of the windings of said rotor.

6. In rotating electrical machinery, a stator, a rotor which includes a set of windings for cooperating therewith, a thermally responsive element which is entirely supported upon said rotor and which comprises a cupped, generally annularly shaped member stamped or otherwise formed from a single flat sheet of bi-metallic material, said thermally responsive element being entirely supported upon said rotor so as to have its center of mass positioned substantially at the axis of rotation of said rotor, said thermally responsive element being movable in a direction generally parallel to said axis of rotation between two extreme positions with a snap action, and means whereby said thermally responsive element when in one of said two positions serves to short circuit at least a portion of the windings of said rotor.

7. In rotating electrical machinery, a stator, a rotor which includes a set of windings for cooperating therewith, and a thermally responsive member which is operable to change the electrical characteristics of said rotor, entirely supported upon said rotor in such position that the center of mass of said member substantially coincides with the axis of rotation of said rotor, said thermally responsive member during its operation being movable in a direction generally parallel to the axis of rotation of said rotor whereby the relative position of the center of mass of said member and the axis of rotation of said rotor remain substantially fixed during the operation of said member.

8. In rotating electrical machinery, a stator, a rotor which includes a commutator and a set of windings connected to the segments of said commutator, at least some of the segments of said commutator having substantially co-planar end surfaces, and a thermally responsive element entirely supported upon said rotor in such position that the center of mass of said element substantially coincides with the axis of rotation of said rotor, said thermally responsive element comprising a cupped, annularly shaped disc or plate normally disposed in electrically insulated, relatively spaced relation to the end surfaces of said commutator segments, said member being adapted under predetermined thermal differences to automatically move into contact with the end surfaces of some of said segments to thereby electrically interconnect those segments.

HAROLD G. BEAUCHAMP.